(12) United States Patent
Dardalis

(10) Patent No.: US 7,004,119 B2
(45) Date of Patent: Feb. 28, 2006

(54) APPARATUS AND METHOD FOR ROTATING SLEEVE ENGINE HYDRODYNAMIC SEAL

(76) Inventor: Dimitrios Dardalis, 2812 Rio Grande, Austin, TX (US) 78705

( * ) Notice: Subject to any disclaimer, the term of this patent is extended or adjusted under 35 U.S.C. 154(b) by 104 days.

(21) Appl. No.: 10/821,672

(22) Filed: Apr. 9, 2004

(65) Prior Publication Data

US 2004/0256809 A1    Dec. 23, 2004

Related U.S. Application Data

(60) Provisional application No. 60/461,496, filed on Apr. 9, 2003.

(51) Int. Cl.
*F01L 7/02* (2006.01)

(52) U.S. Cl. .................. 123/43 R; 123/314; 123/59.3; 123/65 VS; 123/80 C; 123/190.17; 123/190.12; 277/399; 277/400

(58) Field of Classification Search .... 123/43 R–43 C, 123/59.3, 65 V, 65 VA, 65 VS, 312–314, 123/8, 193.2, 193, 41.83, 41, 196 V; 277/399–401, 277/408
See application file for complete search history.

(56) References Cited

U.S. PATENT DOCUMENTS

| | | | | |
|---|---|---|---|---|
| 3,730,152 A | * | 5/1973 | Vincent et al. | 123/44 R |
| 3,921,602 A | * | 11/1975 | Froumajou | 123/44 D |
| 4,403,873 A | * | 9/1983 | Gardner | 384/306 |
| 5,199,391 A | * | 4/1993 | Kovalenko | 123/43 B |
| 5,399,024 A | * | 3/1995 | Shapiro | 384/124 |
| 5,702,110 A | * | 12/1997 | Sedy | 277/400 |
| 6,289,872 B1 | * | 9/2001 | Dardalis | 123/314 |
| 6,446,976 B1 | * | 9/2002 | Key et al. | 277/367 |

* cited by examiner

*Primary Examiner*—Marguerite McMahon
(74) *Attorney, Agent, or Firm*—Rick B Yeager

(57) ABSTRACT

A hydrodynamic face seal 100 for sealing between the cylinder head 300 and rotating sleeve 200 of a rotating liner engine. The face of the face seal provides a sealing zone 130 for maintaining a lubricant layer of about 2 micrometers between the face seal and the sleeve; and a loading zone 132. The loading zone includes hydrodynamic lift features such as inclined pads 150 or recessed step pads 152. Oil is supplied to annular oil supply passage 142 between the sealing zone and the loading zone, and flows from the annular oil supply passage to radial passages 144 located between the step pads. A spring pre-load is provided to the seal. An outer secondary seal 190 is provided to contain the lubricant. One or more inner secondary seals is provided to contain lubricant and combustion gases. Spiral oil pumping grooves may be provided.

24 Claims, 14 Drawing Sheets

US 7,004,119 B2

APPARATUS AND METHOD FOR ROTATING SLEEVE ENGINE HYDRODYNAMIC SEAL

RELATED APPLICATIONS

This application is related to and claims priority from applicants' U.S. Provisional Patent Application No. 60/461,496 filed Apr. 9, 2003.

BACKGROUND

1. Field of Invention

This invention relates to a method and apparatus for a hydrodynamic face seal between a rotating cylinder liner and a cylinder head in an internal combustion engine.

2. Description of Prior Art

This patent describes improved sealing methods and mechanisms between the cylinder liner and the cylinder head of a rotating sleeve engine or rotating liner engine (RLE). In a conventional engine, a seal between the cylinder head and stationary cylinder is typically obtained by compressing a head gasket between the head and the cylinder. Since the RLE has a rotating liner, an alternate means of sealing between the block and the liner is required.

Prior Art—The '872 Patent

The RLE is described in U.S. Pat. No. 6,289,872 issued Sep. 18, 2001 to applicant Dardalis. The '872 patent is incorporated by reference in this application. The RLE is a valved engine which provides a rotating liner, also called a sleeve, within the cylinder in order to reduce mechanical friction by maintaining hydrodynamic lubrication between the piston sealing means, which is typically one or more piston ring, and the rotating liner.

FIG. 1, which is FIG. 1 of the '872 patent, shows a first prior art embodiment. In the first embodiment, the '872 patent describes a set of pressure activated sealing devices 6 installed on the upper part of the rotating liner flange 4. The sealing devices 6 fit into a recess on the cylinder head 3 to prevent high pressure combustion gases from entering the space between the rotating liner 1 and the block 5. In FIG. 1, one prior art pressure activated seal is shown. This seal is a compression ring which provides a spring load against the outside of its groove machined into the cylinder head 3 and also provides a spring load against the sleeve flange 4.

FIG. 2, which is FIG. 5 of the '872 patent, shows a second prior art embodiment. In this second embodiment, a conical pressure activated sealing device is shown. A conical ring 21 fits on a conical groove 22 machined on the cylinder head 3. Like typical compression rings, that seal has an open end. The diameter of the conical ring when uncompressed is a little larger than the conical groove. Therefore, when forced into the groove 22, the spring force developed forces it against the outside wall of groove 22. Due to the inclined surfaces, a spring load develops between the lower surface of ring 21 and the upper flat surface of the rotating sleeve.

In a high combustion pressure variation of this embodiment, also shown in FIG. 2, an additional compression ring 23 is fitted on groove 24 machined on the flange of the rotating sleeve. Any combustion gasses that escape the main conical seal 21 are trapped by ring 23. Since ring 23 isolates the conical ring 21 from oil coming from the area between the sleeve and the cylinder, an additional oil supply 25 is provided to lubricate the conical seal as well as the interface of the upper part of the flange and cylinder head which acts as thrust bearing. A similar oil passage to 25 is provided on the opposite side and acts as oil return.

FIG. 3, which is FIG. 9 of the '872 patent, shows another prior art embodiment. In this embodiment, the bottom surface of the conical seal of FIG. 2 further includes a plurality of recessed inclined pads 46. The depth of these pads is exaggerated in FIG. 3 for clarity. In this embodiment, the pads machined along the compression ring 23 bottom sealing surface promote hydrodynamic lubricant pressure build up and help avoid metal to metal contact. The pads are imbedded in the sliding surface of ring in order to allow a tight sealing clearance in the rest of the surface.

Prior Art—Sleeve Valve Engine Sealing

The prior art Sleeve Valve Engine (SVE) was a ported engine. Porting was accomplished by the rotation and reciprocation of the sleeve relative to the cylinder walls. By contrast, the RLE has rotation, but not reciprocation, of the rotating liner.

The SVE typically used a set of piston rings in the junk head to achieve the sealing between the head and the moving sleeve. These piston rings operated hydrodynamically. Due to the reciprocating-rotating nature of the sleeve motion, this design worked well for the SVEs in terms of sealing effectiveness as well as friction and wear.

Although this design was effective for the SVE at that time, there are several limitations to its use with the RLE. Such a design would be difficult to lubricate for pure rotation, and the end-gaps of the rings allow a new blowby path which is not likely to be acceptable under current emissions requirements. Therefore, it is desirable to provide a face seal for the RLE in order to eliminate the blowby path at the ring end gaps. The face seal design preferably includes a means of providing a continuous oil supply to the seal.

Applicant Dardalis' PhD dissertation, which was published in August 2003, provides background on technical issues related to the RLE, specific modeling and test results, and additional background on the SVE.

SUMMARY OF INVENTION

The current invention is directed to a hydrodynamic face seal for an internal combustion engine having a rotating cylinder liner.

An objective of the rotation of the liner, or sleeve, in the RLE is to maintain a sliding motion between the piston rings and liner close to top and bottom dead center in order to provide a hydrodynamic lubrication regime throughout the piston stroke. In one embodiment of the RLE, a flange on the upper part of the liner transfers the thrust loads to the cylinder head and the block. The flange also reinforces the upper part of the sleeve, thereby preventing or minimizing the sleeve expansion due to high cylinder pressure that occurs when the piston is in proximity to top dead center.

One technical challenge of the RLE is to provide a seal between the rotating cylinder liner and the stationary cylinder head. This seal preferably has low friction, long life, significantly lower gas leakage than through the ring-pack, and low lubricant leakage into the combustion chamber. During each combustion cycle, the gas pressure typically cycles quickly between a relatively low pressure and a relatively high pressure at the top of the piston stroke. It is desirable that the seal work effectively throughout this range of gas pressures, and that the seal not significantly increase the amount of oil introduced into the combustion chamber.

One embodiment of the current invention provides a hydrodynamic face seal between the liner or the liner flange and the cylinder head. A hydrodynamic face seal is a seal where the rubbing surfaces slide with no metal-to-metal contact via a lubricant layer such as oil. In a hydrodynamic face seal, the gap between the surfaces is small enough to seal, thereby minimizing gas leakage. The advantage of a hydrodynamic face seal is that a small quantity of lubricant can exist in the sealing gap, and since the viscosity of the lubricant is very much higher than the gas, it will essentially block gas leakage. It is generally accepted that most of the gas leakage in engine piston rings is through the end-gap, and the only time when some gas leakage occurs in the main ring/liner sealing gap is when bore distortions increase the film thickness locally. Therefore, if a hydrodynamic face seal can be provided with no end-gap, and if a lubricant can be maintained in the sealing gap, then gas leakage can be virtually blocked.

The seal preferably has a high tolerance in the bottom surface, or face. In prototype seals, this tolerance was achieved with reasonable success by CNC machining and lapping.

The hydrodynamic face seal requires fresh lubricant supply, which will also have to be continuously replenished. The leakage of lubricant to the combustion chamber needs to also be extremely low or zero. If any significant leakage does take place, it should only be a fraction of the amount of oil layer on the cylinder wall after each piston stroke. A small amount of oil can be handled by the oil control rings, so that oil consumption is unaffected.

DETAILED DESCRIPTION OF EMBODIMENT

Hydrodynamic Face Seal

Figure 1:
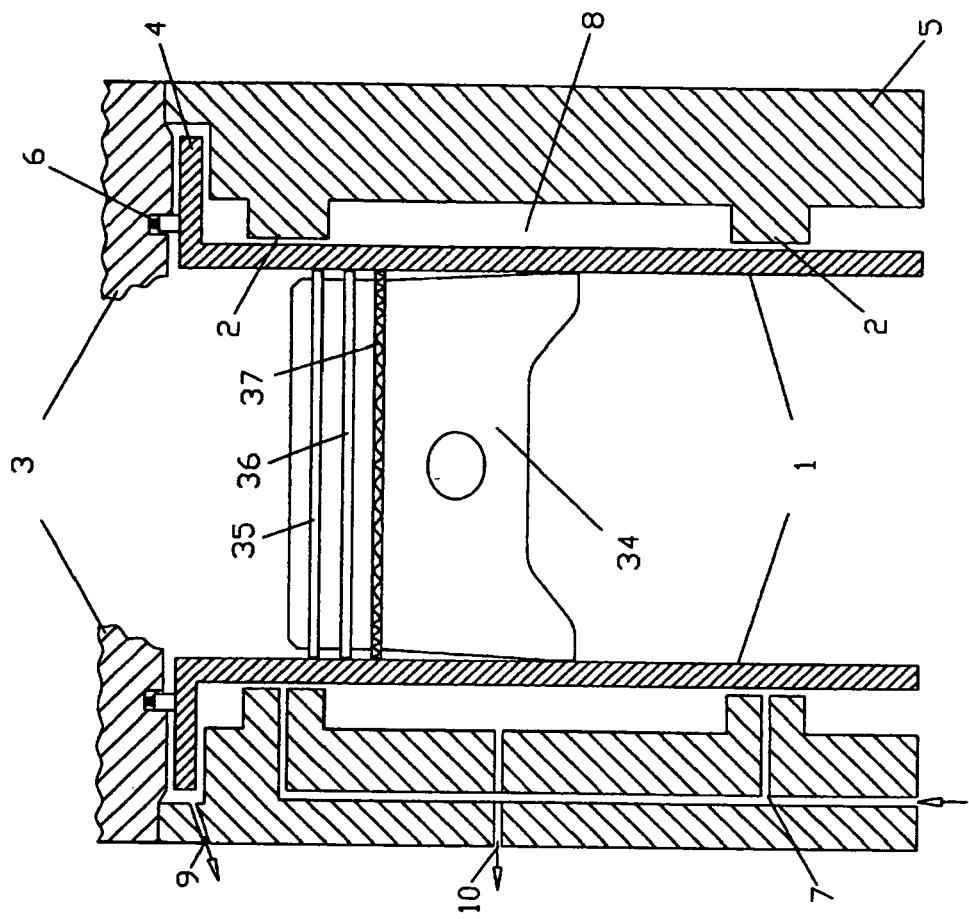
FIG. 1 shows a prior art embodiment of FIG. 1 of U.S. Pat. No. 6,289,872.
Figure 2:
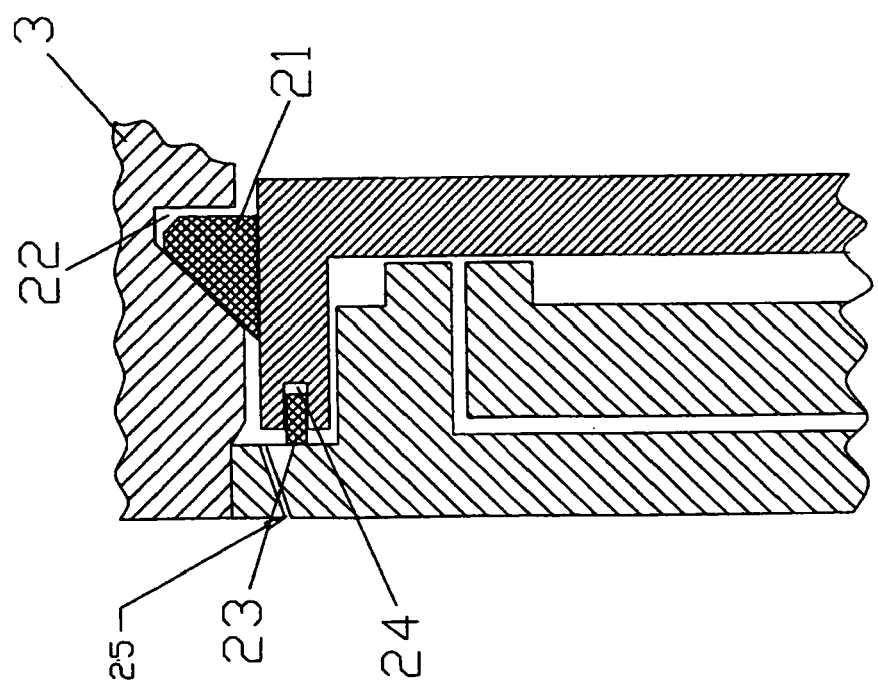
FIG. 2 shows a prior art embodiment of FIG. 5 of U.S. Pat. No. 6,289,872.
Figure 3:
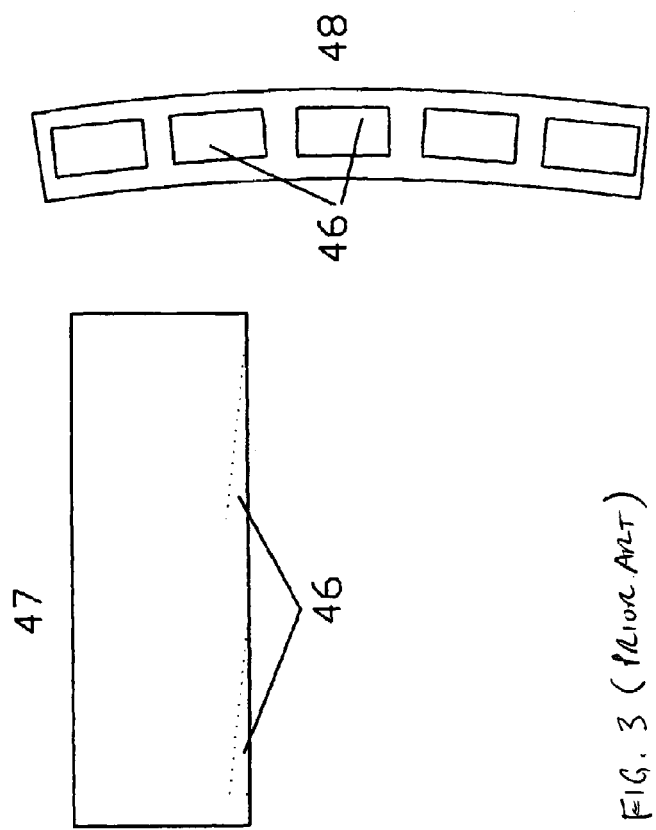
FIG. 3 shows a prior art embodiment of FIG. 9 of U.S. Pat. No. 6,289,872.
Figure 3:
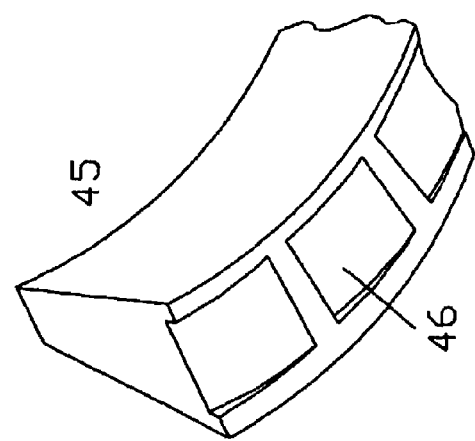
Figure 4:
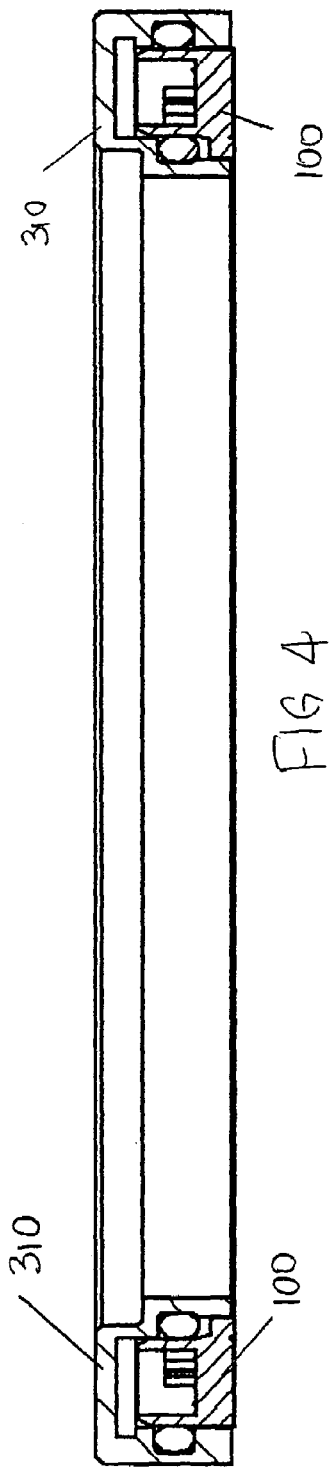
FIG. 4 is a side view of a hydrodynamic face seal and head insert.

FIG. 4 is a side view of a hydrodynamic face seal 100 which is positioned within a head insert 310. Each cylinder in an RLE will typically have a rotating sleeve or liner, and a seal between the rotating liner and the cylinder head.

Figure 5A:
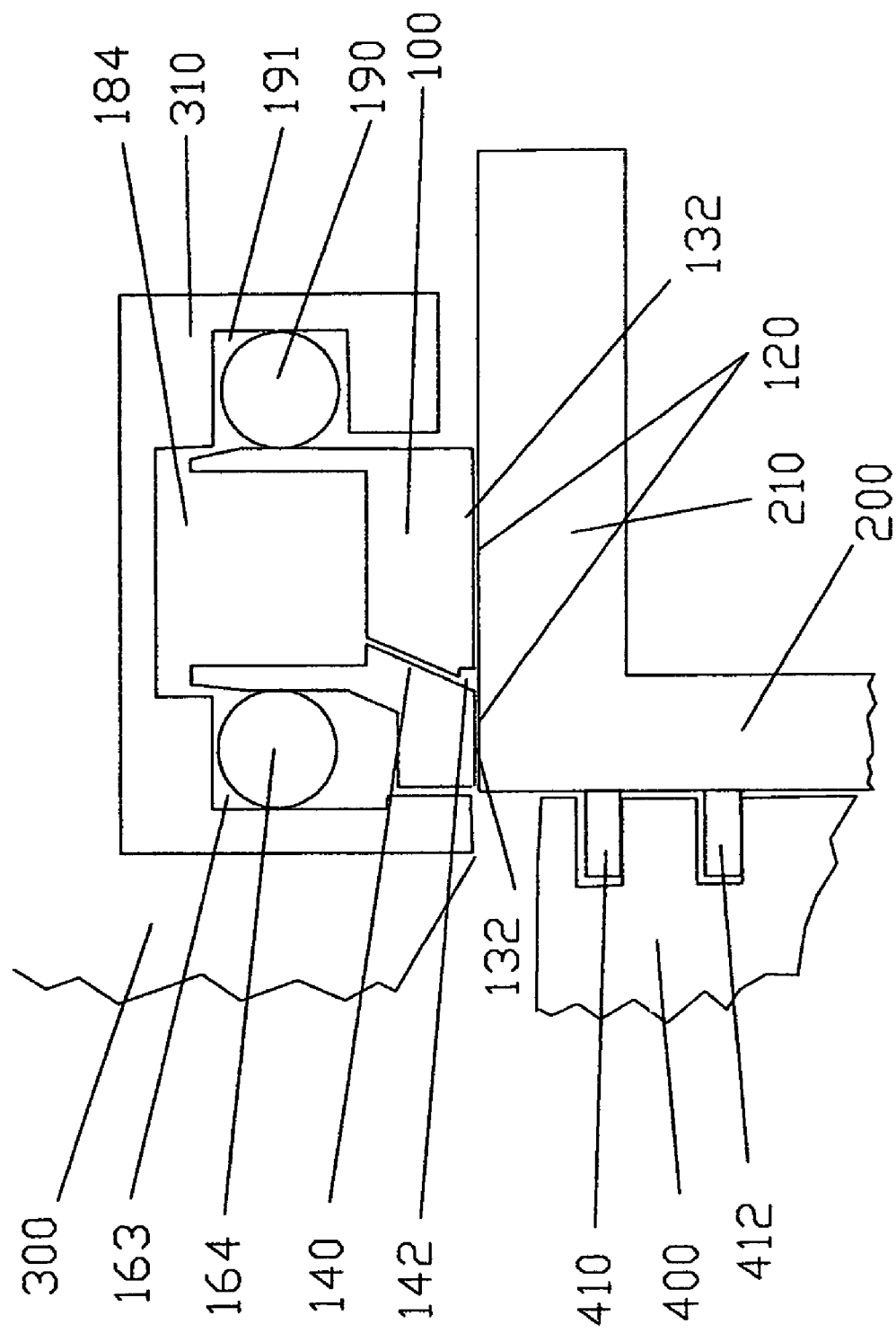
FIG. 5A is a side view of a hydrodynamic face seal

FIG. 5A shows the relative position of an example hydrodynamic face seal 100 sealing the interface of the rotating liner 200 and the cylinder head 300. A portion of a piston 400 and piston rings 410, 412 are shown for reference. In this example, the rotating liner includes a top flange 210. The bottom surface, or face, 120 of the face seal 100 provides a sealing zone 130 and a loading zone 132 between the seal 100 and the top flange 210. The face seal is typically positioned in a head insert 310 in the cylinder head 300. An oil supply cavity 184 is located in head insert above the face seal 100, and oil is provided from this oil supply cavity to the sealing zone and loading zone. Oil is provided from this oil supply cavity through oil supply passages 140 to the face 120.

Detailed Description of Embodiment—Hydrodynamic Face Seal with Tilted Pad Bearings The face of the hydrodynamic face seal typically includes hydrodynamic lift features such as inclined pads or step pads that provide a separation force as the rotating liner rotates relative to the face seal. In alternate embodiments, the hydrodynamic lift features may be provided on the rotating liner.

Figure 5B:
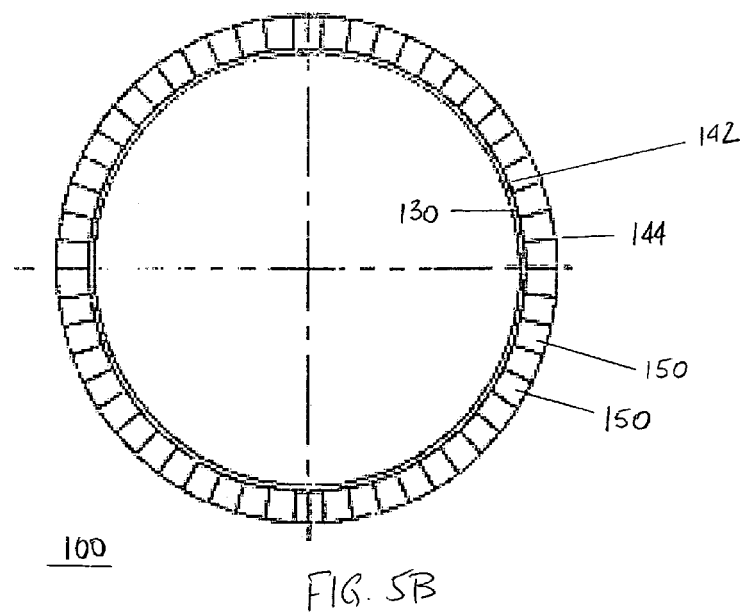
FIG. 5B is a bottom view of the hydrodynamic face seal of FIG. 5A.

FIG. 5B is a bottom view of a hydrodynamic face seal 100 with a plurality of tilted pad bearings 150 on its face 120. The face and tilted pad bearings slide on a lubrication layer over the flange of the rotating liner.

Figure 5D:
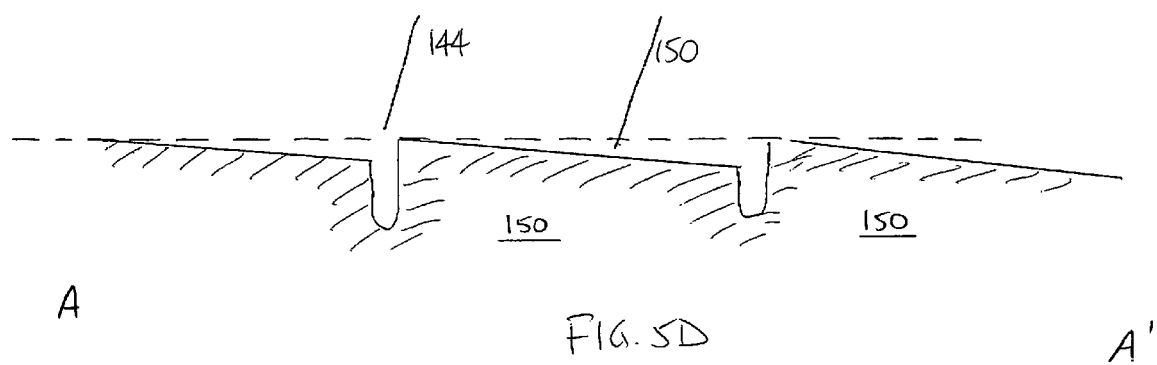
FIG. 5D is a detailed side view of a portion of the face seal of FIG. 5A.
Figure 5C:
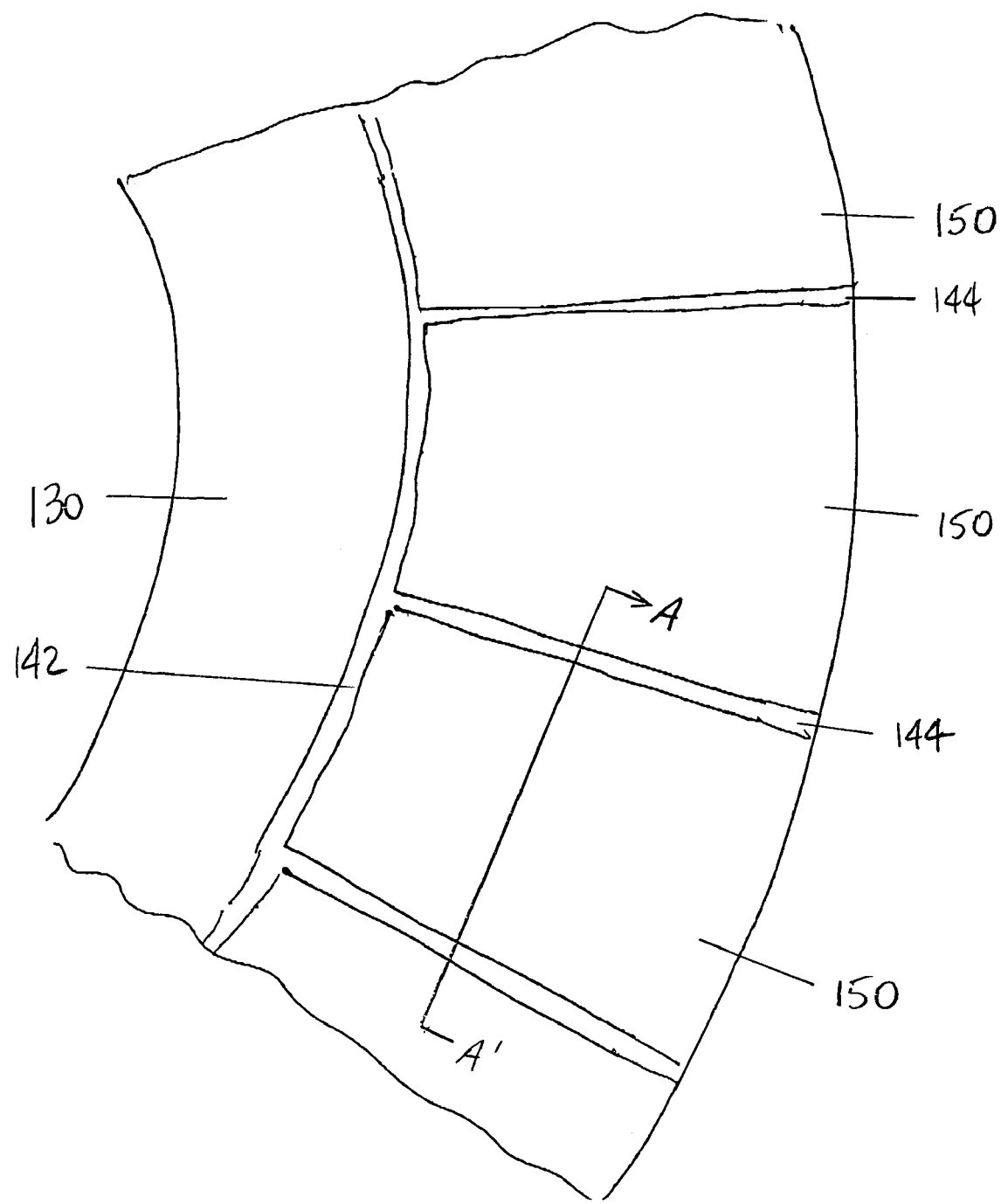
FIG. 5C is a detailed bottom view of a portion of the face seal of FIG. 5A.
Figure 5E:
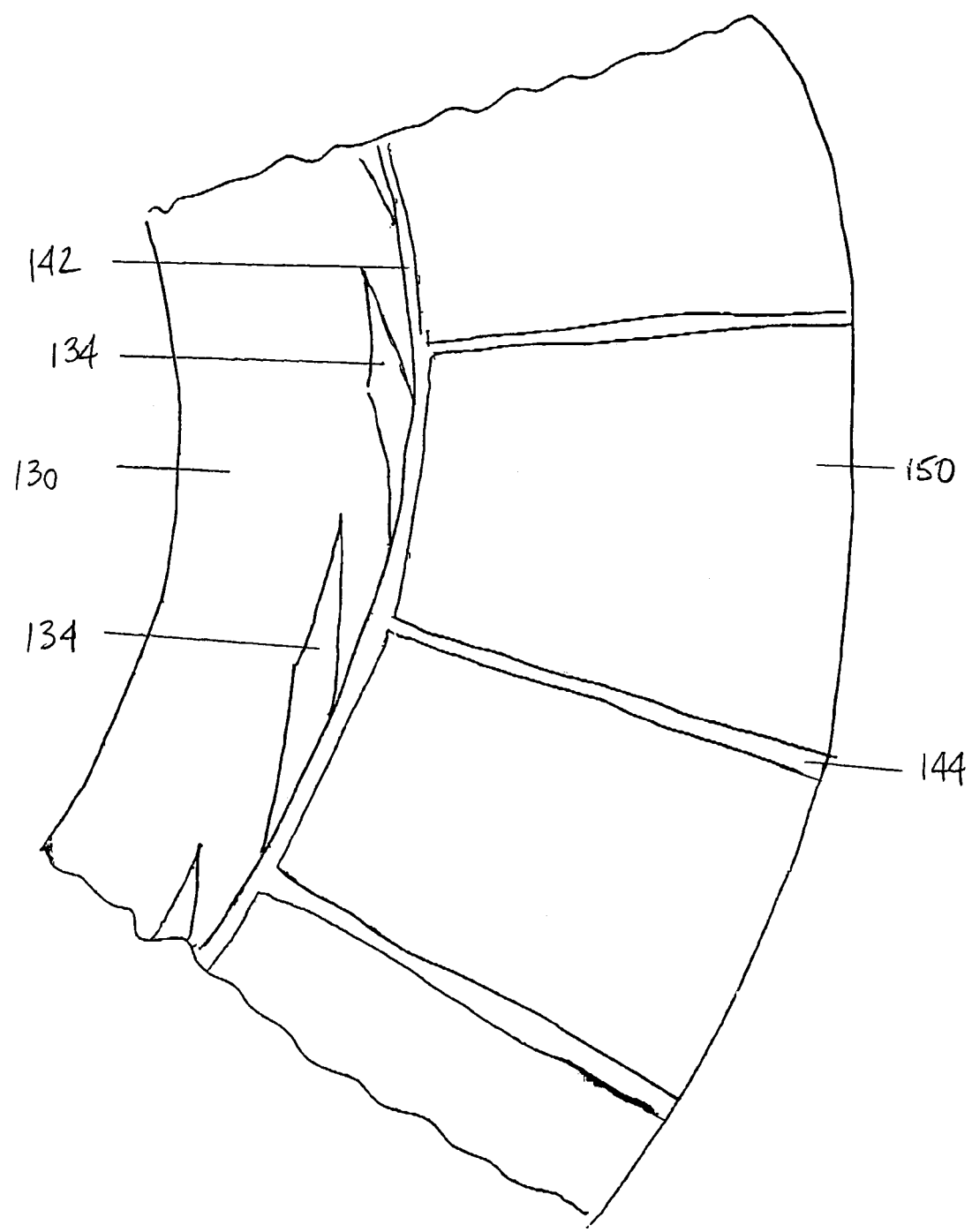
FIG. 5E is a detailed bottom view of a portion of the face seal of FIG. 5A with spiral pumping features.

FIG. 5C is a detailed bottom view of a portion of the face seal of FIG. 5B. The face includes a plurality of tilted pad bearings 150. The bottom face comprises the face seal loading zone 132; a sealing zone 130; and an annular oil passage 142.

FIG. 5D is a detailed side view of a portion of the face seal of FIG. 5C. This side view illustrates the inclined pad hydrodynamic lift features. Oil is supplied from the radial supply passage 144 to the deeper portion of the inclined plane. As the liner rotates toward the shallow portion of the recessed pad, the tilted pad and the liner face form converging surfaces, and lift is created.

In this example, oil is supplied from the oil supply cavity 184 to the circular oil passage 142 by nine equally spaced oil supply passages 140.

In this example, the face seal has an outside diameter of approximately 4.5 inches (11.4 cm) and inside diameter of 3.620 (9.195 cm) inches for a 3.620 (9.195 cm) inch bore engine. The sealing zone 130, which is the inboard 0.040" (1.0 mm) of the seal, is lapped very flat and achieves a tight seal against the liner flange. In this example, the sealing zone width was selected as being comparable to the sealing zone width of piston rings for engines of similar size.

Just outside the sealing zone, nine oil supply passages 140 are provided, and pressurized oil is pumped through the oil passages. These oil passages provide oil to the annular oil passage 142 which distributes the oil to fifty four radial passages 144. The radial passages route the oil flow outwards on the bottom surface of the face seal. In this example, each of the radial passages 144 is located between adjacent tilted pad bearings 150. The tilted pad bearings 150 create hydrodynamic lift and support load, similar to a tilted or step pad thrust bearing. In an alternate embodiment, a step pad bearing creates this lift and support.

In this example, the tilted pad bearings are inclined recess areas where the depth of the recesses converges in the direction of the liner rotation, thereby creating a lifting force on the face seal as the liner rotates. This lifting force helps maintain the film thickness in a range large enough to avoid metal to metal contact between the face seal and the liner. In other embodiments, lift features are provided on the liner flange rather than on the face seal.

A return passage guides the oil that flows out of the seal back to the oil sump. In this example the face seal is held stationary relative to the cylinder head. A stationary secondary seal 164 is positioned between the cylinder head 300 and the face seal 100. In this example, the secondary seal is a high temperature O-ring 190. In this example, a single stationary seal is used to seal against both combustion gas and oil. In other examples, two secondary seals may be provided so that one secondary seal is directed at combustion gas, and a second seal is directed at retaining oil. Production engines may use other types of secondary seals such as metal or Teflon bellows.

High pressure lubricant is pumped into the oil supply cavity 184 above the face seal by the oil pump. The pressure forces oil through the oil supply passages 140 of the face seal to the circular oil passage 142, and supplies an even pre-load on the sealing ring. This excess oil flow cools the face seal from the heat of combustion. An outboard O-ring 190 contains oil in the oil supply cavity 184 above the face seal. Additional pre-load is supplied by a plurality of coil springs 180 (not shown) positioned in the oil supply cavity 184 and acting downwardly on the face seal. Alternately, a single wavy spring may be employed.

In this example, the face seal is partially balanced, so that the area subject to gas pressure that exerts the closing force on the seal, is smaller than the total face area that bears the load. This achieves a distribution of load while maintaining a small sealing gap.

Detailed Description of
Embodiment—Hydrodynamic Face Seal with Inner
and Outer O-Rings FIG. 5A illustrates a face seal 100 with an inner O-ring 164 and an outer O-ring 190. The inner O-ring 164 is positioned within an inner O-ring cavity 163. The outer O-ring 190 is positioned within an outer O-ring cavity 191. In this embodiment, the outer O-ring contains the lubricant, and the inner O-ring serves a dual purpose in sealing combustion gas and the lubricant. In other embodiments, a second inner sealing means is used so that a first sealing means contains the combustion gas, and a second sealing means contains the lubricant.

The face seal 100 is placed into the head insert 310, which is installed inside a groove machined on the cylinder head 300. The dimensions of the groove and head insert are selected such that the face 120 of the face seal 102 is on about the same plane as the lower face of the cylinder head 300.

The head insert has multiple functions. The insert seals against the head water jackets that will typically be opened as the groove in the head is machined to house the insert. The insert houses the inner O-ring 164 and the outer O-ring 190. In this example, the inner O-ring 164 achieves the secondary gas sealing with a tight gas seal between the head insert and the face seal itself. The outer O-ring 190 also contains the pressurized oil that is pumped by the oil pump on the upper region of the seal, between the insert and the face seal.

The pressurized oil has two functions. The oil provides about $\frac{2}{3}$rds of the pre-load of the face seal. About $\frac{1}{3}^{rd}$ of the face seal pre-load is provided by coil springs compressed between the ring and the head insert. The oil also provides the lubrication for the bottom surface 120 of the seal through the holes 140, as described in FIGS. 5A–5D. In this example, the sealing zone is expanded to about 1.5 mm wide.

Figure 7:
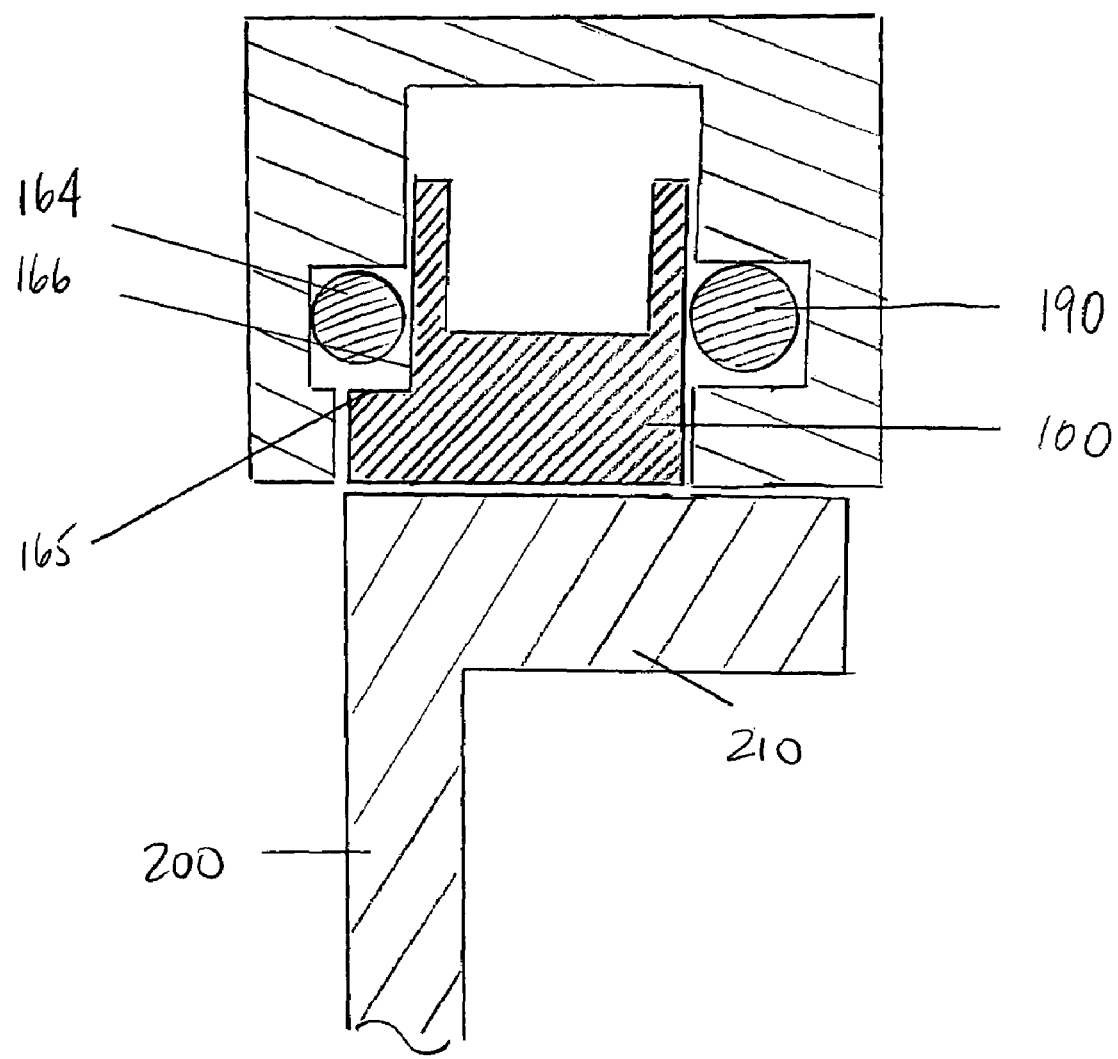
FIG. 7 is a side view of a hydrodynamic face seal showing secondary sealing details.

FIG. 7 is a side view of a hydrodynamic face seal showing secondary sealing details. In this example, the general face features of the seal of the embodiment of FIGS. 5A–5D are retained, however the cross section of the seal is somewhat more complicated. The horizontal surface area 165 below the inner O-ring 164 is the area that applies the gas pressure activated closing force on the seal. This pressure is distributed on the load support area (which is primarily the loading zone of the face), which is about six times larger than the area subjected to the gas pressure that applies the closing force (the horizontal surface area 165). Those familiar in the science of face seals would recognize the term "balance ratio". This horizontally projected area that is exposed to the gas pressure creates a closing force which is equal to the product of the pressure and projected area. This closing force is distributed over the roughly 6 times higher face area of the face seal, and more specifically, the majority of this force is transferred to the loading zone portion of the face where hydrodynamic lift features are provided in order to allow the seal to operate at very high peak cylinder pressure with low friction.

Referring again to FIG. 5A, which is a detailed cross section view of the face seal, in order to achieve a close to uniform pressure distribution on the face of the seal, it is desirable to transfer some load from the inside of the seal to the outside where the hydrodynamic pads are located. This transfer of load is accomplished by removing material from the upper part of the ring, thus creating a large cavity 184, which also serves as the oil supply cavity. The cavity lowers the structural center of gravity of the face seal cross section closer to the bottom surface 120.

Referring again to FIG. 7, another factor in this load transfer is the fact that gas pressure is also applied in the vertical inside cylindrical wall 166 of the seal, all the way to the upper end of the inboard O-ring groove 163. So, when the gas pressure in the engine is elevated at a value higher than the oil pressure, the inboard O-ring 164 will move upwards, thereby exposing the inside vertical wall 166 of the seal to gas pressure.

Detailed Description of
Embodiment—Hydrodynamic Film Thickness

Figure 8:
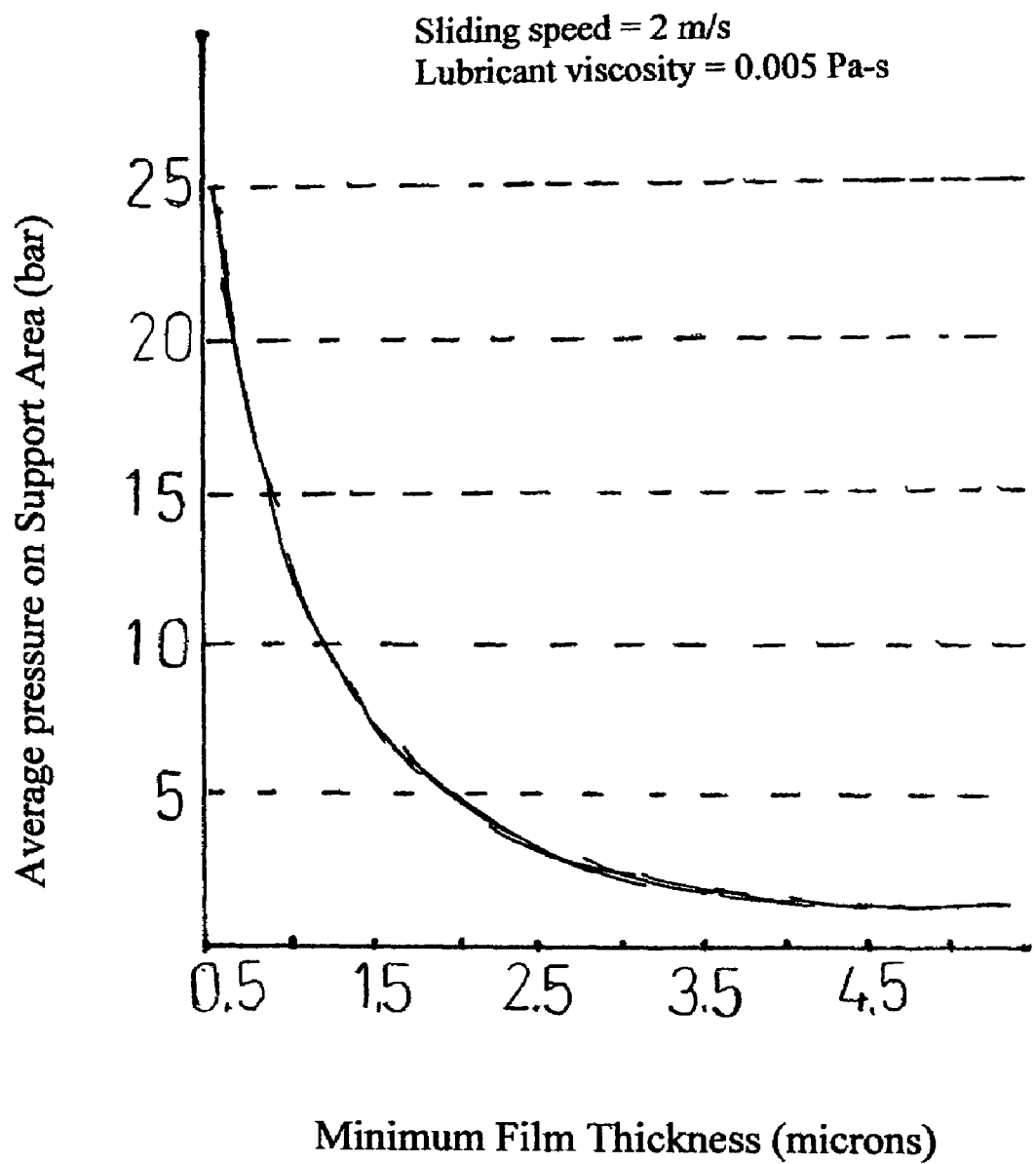
FIG. 8 is a graph of the film thickness versus the predicted face hydrodynamic pressure load for an 8 micron deep tilted pad example.

The sealing zone of the seal is used to seal both oil and gas. The oil control is achieved by applying a significant pre-load on the seal, like an oil control piston ring, thus forcing the minimum film thickness to be low. FIG. 8 is a graph of the predicted hydrodynamic film thickness versus the total pressure load for an 8 micron tilted pad example. (The 8 micron tilted pad example results are similar to a 5 micron step pad example.) The total pressure load is the total ring load divided by the face area, where ring load is pre-load plus closing force from gas pressure for a tilted pad ring. In another embodiment, step pad bearings show similar trends. The seal operates under a balance ratio of about 6:1, and thus only $\frac{1}{6}^{th}$ of the face area is subject to closing force. So, a 60 bar gas pressure will roughly add 10 bars of additional ring load.

Referring to FIG. 8 modeling predicts that if the ring pre-load is about 300 lbf, so that the corresponding pressure is about 5 bar, the minimum film thickness will be of the order of 2 micrometers. A leakage rate may be estimated by first estimating the average pressure in the annular groove which is feeding lubricant to each pad. This pressure is the driving pressure for lubricant leakage.

As the cylinder gas pressure increases during the compression stroke, the closing pressure forces the seal to close, just like any pressure activated seal. As discussed above, when the gas pressure is 60 bars, there is an added load on the ring of about 10 bars, and therefore referring to FIG. 8, the film thickness for that condition is estimated at about 1.25 micrometers. The typical limit of hydrodynamic lubrication for highly polished surfaces like a face seal is about 0.4 micrometers. Therefore, the theoretical maximum pressure this seal would support at 2 m/s without any metal to metal contact would be over 25 bars, which corresponds to a gas pressure of 120 bars, which is the net pressure of 20 bars times the balance ratio of 6. Higher liner speed would increase the film strength and therefore tolerate even higher pressures. The upper limit of peak cylinder pressures for modern industrial engines is about 180 bars, therefore the current design appears to have the potential of meeting the requirements. Also, as seen on the leakage equation, the leakage rate is proportional to the $3^{rd}$ power of film thickness. Therefore, these very tight films during high pressure will assist towards very low leakage rates.

The basic model of force balance ignores many factors which may be addressed in more sophisticated models. The factors include squeeze film effects (that will greatly enhance the seal performance), moment balance and seal tilt, hydrostatic support (which will decrease gas pressure closing force), and gas-oil interactions.

Tilting of the Seal

The center of pressure that is trying to radically expand the seal can be easily raised well over the cross section elastic center of gravity, creating a moment that is trying to tilt the ring such that the outer edge will tend to be below the inner edge. This moment action is used to transfer the pressure activated closing force, so that the distribution of the pressure is close to uniform. Both the magnitude of the twisting moment and the closing force are proportional to pressure, so this balancing action should work regardless of gas pressure. Design parameters that can be altered to achieve a balanced operation include the shape of the cross section, as well as the axial distance of the upper end of the O-ring gland from the face of the seal. In this embodiment, structural analysis led to a desired distance between the face of the seal and the end of the O-ring gland of about 0.200 inches.

Detailed Description of
Embodiment—Hydrodynamic Face Seal with Step
Pad Example

Operating film thickness may be estimated for both high and low pressure by excluding squeeze film effects. In this example, the tilted pad bearings 150 of the above embodiment were replaced with step pad bearings 152 due to fabrication issues. The step pad bearing is also referred to as Raleigh bearing. A fabrication method was developed with chemical etching and lapping that could achieve a step pad with a 5 micrometer depth. The smaller the shallow part of the step is, the lower this load distribution advantage. Also, as the shallow area of the step shrinks, the performance in terms of load capacity approaches more the performance of a tilted pad bearing of the same height, and the viscous losses diminish. As a compromise, it was chosen to use a 20% shallow, 80% deep step pad of 5 microns deep. The performance of this design in terms of load capacity and viscous friction is of about equivalent performance to the 8 micrometer tilted pad. Therefore, the prior film thickness predictions from above are still valid. In addition to advantages in fabrication complexity, the step pad bearing offers a larger contact area for startup conditions, reducing contact pressure for these critical moments.

The step pad and surface features may be provided on the face of the seal ring or on the face of the liner.

Detailed Description of
Embodiment—Hydrodynamic Face Seal with
Sealing Zone Spiral Grooves Example An improved method of accelerating the oil flow inwards in the sealing zone in order to enhance the effectiveness of the sealing zone is via inward pumping spiral grooves 134 in the sealing zone. In this embodiment, the first $\frac{1}{3}^{rd}$ of the sealing zone closest to the annular grove (0.5 mm wide) has a 5 micrometer deep, 10 degree spiral grooves. The 5 micrometer depth was selected to be consistent with the depth of the step pads, so that the part is easier to manufacture. These types of features are typical for face seals.

If the rotating liners are energized by gears from the crankshaft, their slower rotary speeds will permit lowering the liner rotation rate when the engine crankshaft speed is reduced. This reduction in liner rotation rate could control oil consumption at lower speeds, but this is not really a very significant issue. If there is an overflow of oil of the sealing zone 130, only a fraction of a mm long 2 micrometer thick of extra oil film will flow inside the liner, a fairly negligible amount in terms of oil consumption, and what the oil control piston rings can handle. The downside of the spiral groove is that once the oil/gas interface is pushed by gas pressure 1 mm away from the inner edge of the sealing zone and into the beginning of the spiral grooves 134, the relatively large gap will force the lubricant out very rapidly, and the sealing zone will operate as a gas seal thereafter in the cycle.

Detailed Description of Alternate
Embodiment—Light Duty Engine Seal

Figure 6A:
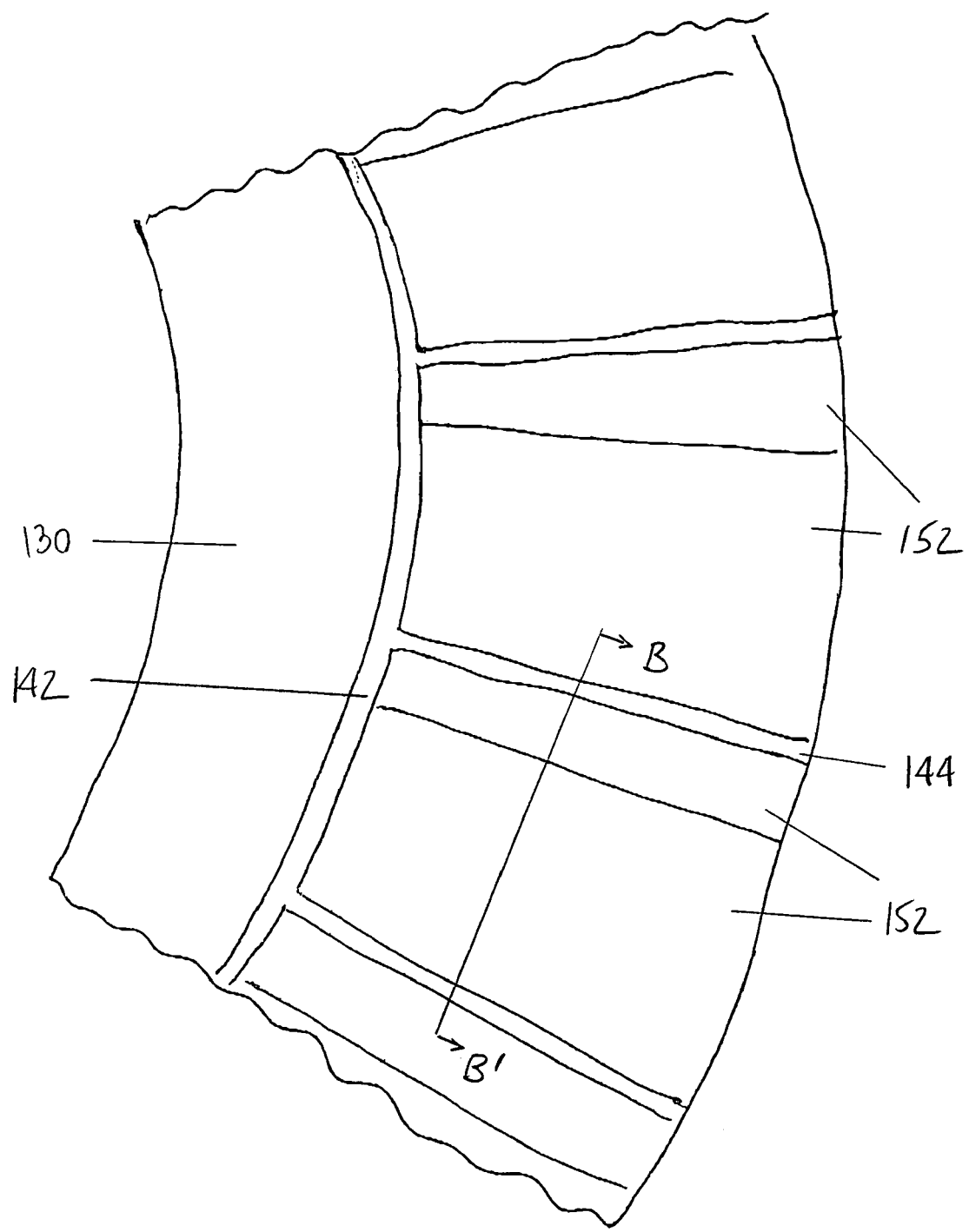
FIG. 6A is a detailed bottom view of a portion of the face seal with step pads.

Referring again to FIGS. 6A–6B, in this example, the inboard 0.060" of the seal is lapped very flat to create a sealing zone 130 which achieves a tight seal against the flange. This sealing zone width is comparable to the sealing zone width of piston rings for engines this size. Just outside the sealing zone, a circular oil passage 142 is provided where pressurized oil is pumped. This passage connects with 54 radial passages 144 that route the oil flow outwards. Between each radial passage, a step pad bearing 152 creates hydrodynamic lift and supports load, similar to a tilted or step pad thrust bearing. A passage guides the oil that flows out of the seal, back to the sump.

A secondary seal between the cylinder head and the face seal, both of which are stationary, is achieved by a high temperature O-ring. Alternately, engines might use other types of secondary seals such as metal or Teflon bellows. High pressure lubricant pumped into the cavity 184 above the face seal by the oil pump forces oil through the holes of the ring to the circular oil passage, and supplies an even pre-load on the ring. This excess oil flow cools the whole seal from the heat of combustion. An outboard O-ring contains the oil in the small chamber above the face seal, which is cut into the cylinder head. Additional pre-load is supplied by one or more coil spring. The size and number of coil springs may be selected to adjust the pre-load.

In this embodiment, a relatively large pre-load of 270 lbf is used, and this large preload in conjunction with the very small depth of the step pads ensures a relatively small film thickness, of the order of 5 μm, during the unloaded parts of the cycle, to ensure that the lubricant is flowing outwards rather than towards the combustion chamber.

The seal is partially balanced. The area subject to gas pressure that exerts the closing force on the seal, is smaller than the total face load support area. This partial balancing achieves a relatively high gas pressure load support capability with sufficient film thickness.

In this example, the cross section has been developed with the aid of analysis tools such that the distribution of gas pressure load is relatively even across the face with small tilt for a wide range of gas pressures. The downward load of the face seal, the preload and gas pressure load, is taken by a hydrodynamic spiral groove bearing that supports the rotating liner axially. The average power consumption of both seal and thrust bearing are within 20 watts, as confirmed by both experimental testing and modeling.

The seals require high tolerance of about the same order as the typical face profile of piston rings and face seals. The very small depth of the hydrodynamic step pads was done by chemical etching and lapping, but these profiles can be generated with the required precision by existing mass production techniques for face seals A detailed model for dynamic pressure performance prediction was created. At full load, 2000 rpm crankshaft speed, and 400 rpm liner speed, the total oil leakage towards the combustion chamber was predicted to be negligible and the gas leakage was predicted to be in the order of 0.06 liters/minute; as compared to blowby through the piston rings on the order of 2.5 liters/minute for the same operating condition. The seal operates throughout the cycle without any metal-to-metal contact, and should have no wear. The predicted viscous losses are of the order of 9 Watts. These results have been partly confirmed by testing the seal on a test rig.

Figure 9:
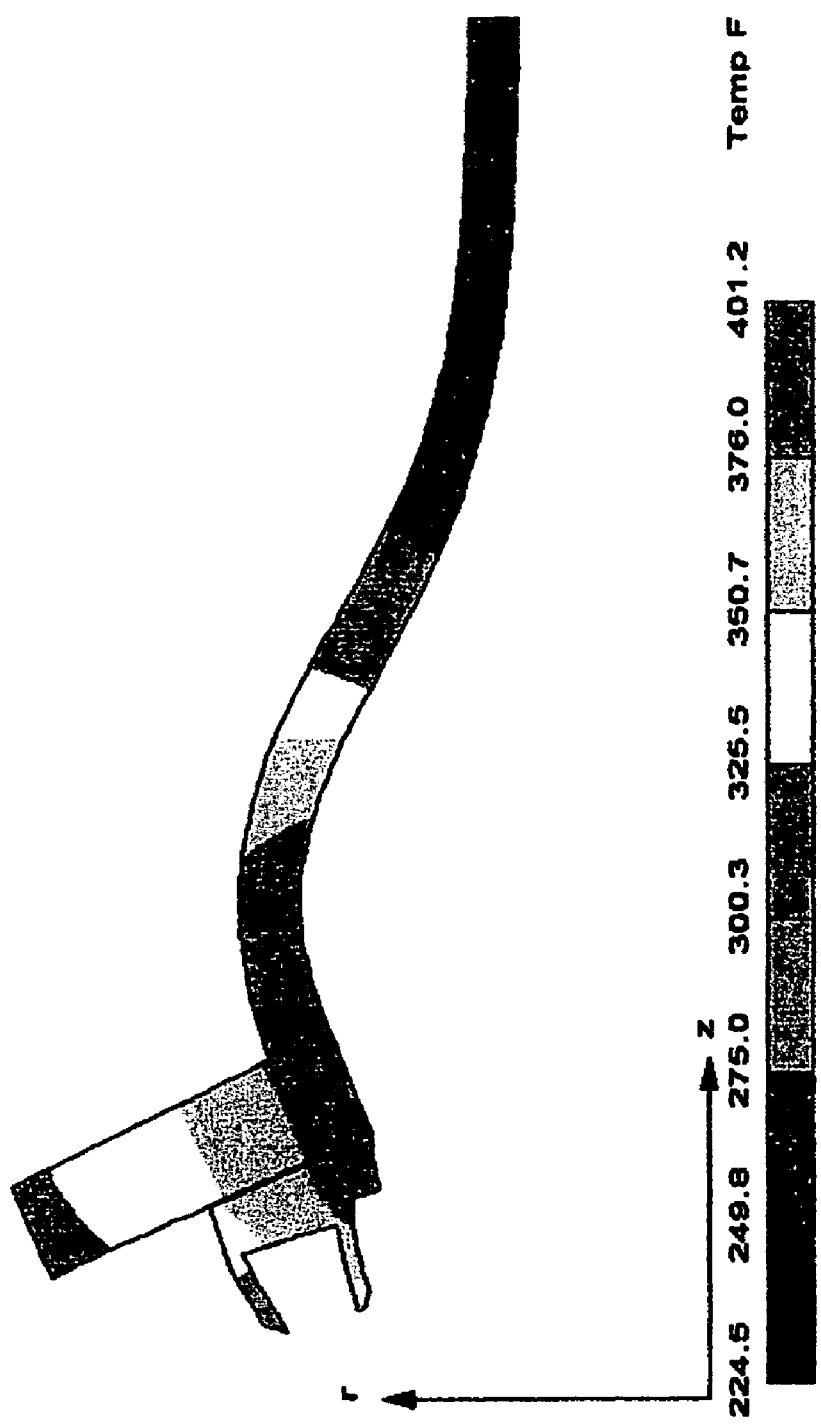
FIG. 9 is a finite element structural analysis plot for a rotating liner and face seal under 1000 psi of cylinder combustion gas pressure

FIG. 9 is an example of the output of finite element structural analysis model results. The rotating liner 200 is on the right, while the seal 100 is on the left. This drawing is showing half of the cross section of the axisymmetric parts where the axis of symmetry is horizontal and located below the figure. The exaggerated distortions show stable seal operation, in spite of the thermal distortions and the 1000 psi gas pressure. Stable operation means that the film thickness is quite small throughout the face ensuring negligible gas leakage, yet there is no metal-to-metal contact ensuring low friction. At this high pressure, the viscous losses are of the order of 12 watts, and there is no wear.

Detailed Description of Alternate
Embodiment—Heavy Duty Engine Seal

The seal of the light duty embodiment described above is intended for a light duty engine with a pressure of 1000 psi or less. In alternative embodiments, the seal and the upper rotating liner are designed for heavy duty engines that often operate with peak pressures of the order of 2000–2500 psi.

Figure 10:
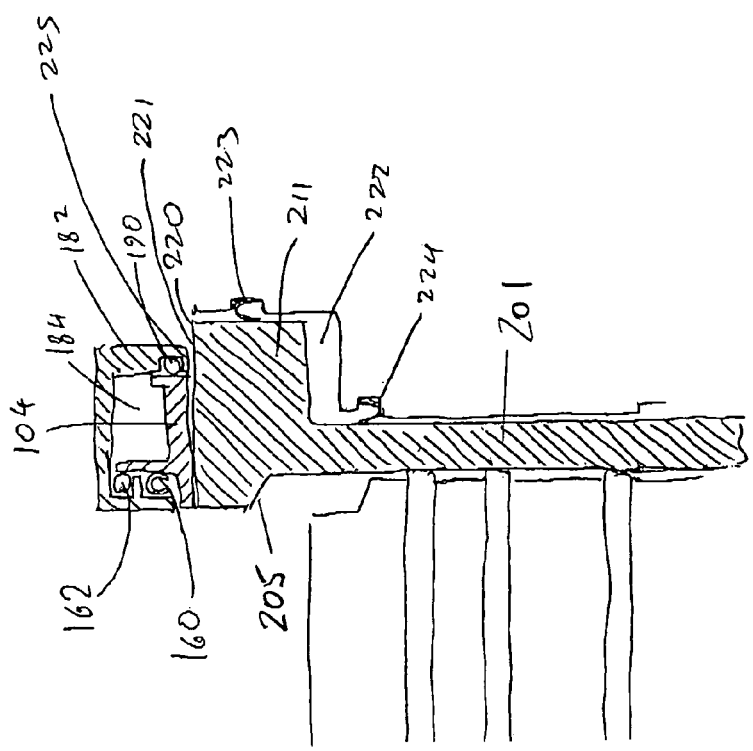
FIG. 10 is an example of a heavy duty seal embodiment where liner flange thrust washer is eliminated
Figure 8:
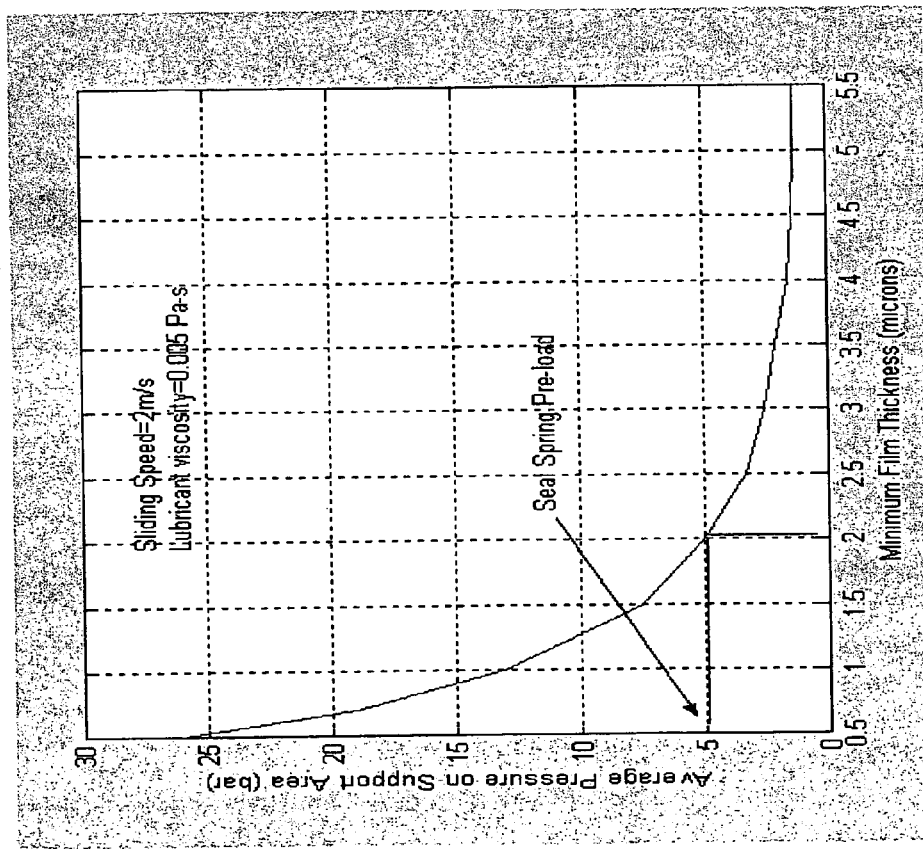

An example heavy duty seal is shown in FIG. 10. The revisions will allow to reduce the cost of the overall design, and also increase the pressure tolerance of the seal. The thrust bearing that supports the liner axially is eliminated, and the face seal 100 itself is much thinner and more compliant in order to facilitate higher liner face thermal distortions as well as non-axisymmetric liner distortions caused by piston side loads, which are expected to higher than those of our light duty engine.

Figure 11:
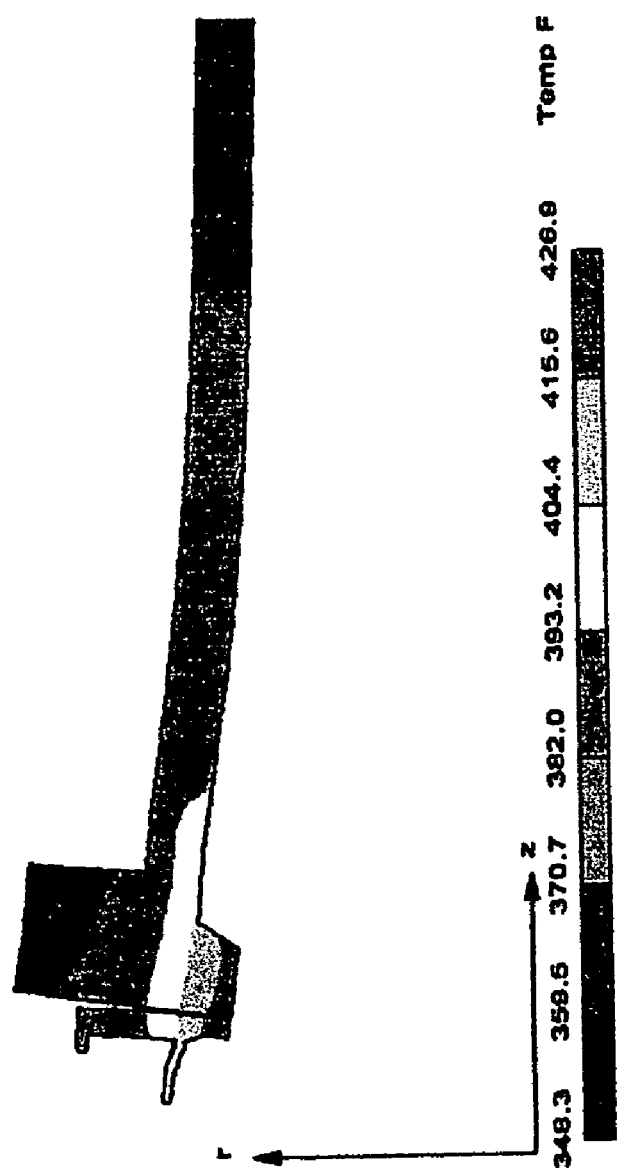
FIG. 11 is a finite element structural analysis plot for the rotating liner and face seal of FIG. 10 under 2500 psi of cylinder combustion gas pressure

FIG. 11 is a finite element structural analysis plot for the rotating liner and face seal of FIG. 10. FIG. 11 shows the predicted pressure and temperature distortions at 2500 psi gas pressure for the heavy duty seal design.

FIG. 10 is an example of a heavy duty seal embodiment where liner flange thrust washer is eliminated. The rotating liner 201 has been stiffened at the upper flange 211 area while the primary sealing ring face seal 104 is now thinner and more compliant. The inset notch 205 on the rotating liner creates axial force due to gas pressure that will compensate the closing force of the seal, such that the net axial loading on the liner due to gas pressure is balanced. The liner thrust bearing is eliminated. The pre-load between the seal ring and the rotating liner is achieved via oil pressure alone.

In the embodiments of FIGS. 5A–5D and 6A–6C, the face seal is forcing the liner downwards. A thrust bearing is typically provided below the liner flange. In one embodiment, this thrust bearing is a thrust washer that has lift features. In this heavy duty seal embodiment, oil pressure is supplied below the flange and the thrust washer may be eliminated. The oil is preferably supplied below the flange at a little higher pressure that in the oil supply chamber that pre-loads the face seal. There is an upward axial component of the gas pressure force on the inset notch 205 that is equal to the gas pressure on the horizontal surface area 165 below the inner O-ring 164. By matching the axial seal gas pressure force and the axial gas pressure liner force (the seal gas activated closing force), the extra thrust washer is not needed for liner support.

Detailed Description of Alternate
Embodiment—Surface Features on Liner

Figure 6B:
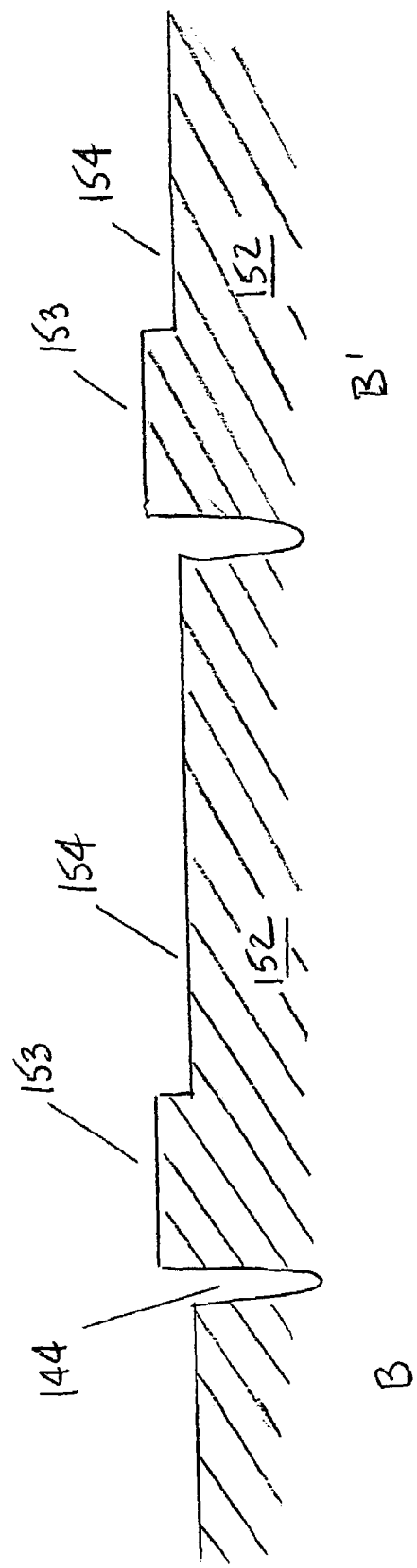
FIG. 6B is a detailed side view of a portion of the face seal of FIG. 6A.
Figure 6C:
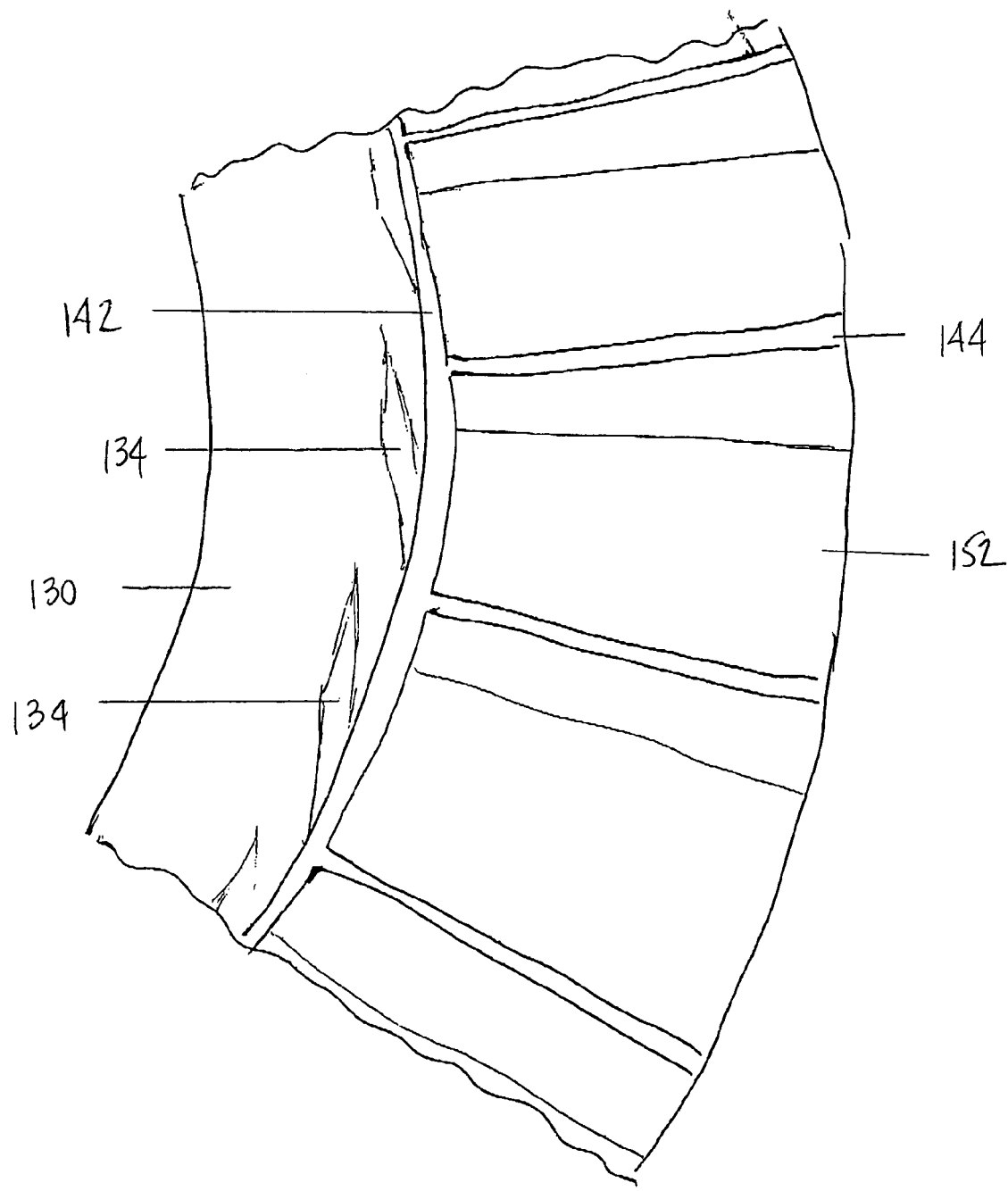
FIG. 6C is a detailed bottom view of a portion of the face seal of FIG. 6A with spiral pumping features.

In this embodiment, the surface features of radial grooves 144 and step pads 132 of FIG. 6B are now on the face of the rotating liner flange 210 rather than on the seal ring 144, and they extend all the way out to the outside edge 220 of the face 221. The seal preload is achieved by oil pressure alone. Oil from the oil pump is pumped in the regions of high pressure oil shown in FIG. 10. The pressure of about 60–80 psi is the same in both chambers, and the value of the oil pressure is determined by the engine's oil pump regulator. The oil chamber 184 on top of the primary seal is contained by two O-rings, the inner O-ring 162 and outer O-ring 190. The oil pressure below the rotating liner flange is contained by two rubber lip seals 223 and 224. The lip seals are stationary, and they rub against the outside rotating liner surface.

The lip seals are similar to crank seals, and do not have to achieve a perfect seal. They only need to limit leakage to the extent that the pressure below the flange 211 is the same as the oil pressure in the oil galleries, while the leakage is small enough so it does not overwhelm the oil pump with too much flow rate. The overall surface area of the flange subject to oil pressure is slightly larger than the surface area of the primary seal, leading to a net axial load upwards.

This difference in loads is compensated by the head insert 182. The insert itself is preferably built of bronze or gray cast iron, so that it is a good bearing material. Its lower surface 225 is lapped, but due to thermal and mechanical head distortions, it is expected to not be perfectly flat. Yet, the relatively small load will eventually break in the two surfaces by wearing the softer distorted face 225 of the head insert 182 and result in a low hydrodynamic friction condition. This load difference is still two or three times larger than the maximum piston friction, therefore the rotating liner primary seal assembly is expected to remain in the upper part of the possible axial positions. This position is defined by the location of the insert rubbing area. In this seal design, the secondary sealing against gas pressure between the primary sealing ring 104 and the head insert 182 is achieved by a Teflon or sheet metal or metal U-cap 160 rather the inner O-ring 162.

In this design, the face features are on the rotating liner. Oil pressure is provided below the liner so that the thrust bearing can be eliminated . The notch in the liner ensures that there is no net loading on the rotating liner due to gas pressure.

Those familiar in the art of face seal design will recognize various alternatives in load balancing, oil distribution, hydrodynamic lift features, secondary sealing, etc. and this application is not limited by the specific examples described above.

What is claimed is:

1. A hydrodynamic face seal for a poppet valve rotating sleeve internal combustion engine, the engine comprising a rotating sleeve which may be rotated during the operation of the engine, and a cylinder head, the face seal comprising
    an annular face which may be positioned in proximity to the rotating sleeve;
    the mating surface comprising
        an inner sealing zone, and
        an outer loading zone, such that the loading zone comprises a plurality of hydrodynamic lift features, such that the lift features create converging surfaces;
    a lubricant supply means, such that the lubricant supply means provides lubricant to the mating surface, and such that a lubricant layer can be maintained between the face and the rotating sleeve.

2. The face seal of claim 1 wherein the hydrodynamic lift features are recessed lift pads.

3. The face seal of claim 1 wherein the hydrodynamic lift features are tilted pads.

4. The face seal of claim 1 wherein the lubricant supply means comprises
    an oil chamber;
    an annular oil supply cavity on the face positioned between the sealing zone and the loading zone; and
    a plurality of supply passages from the oil chamber to the annular oil supply cavity, such that oil may be provided from the oil chamber through the annular oil supply cavity to the sealing zone and loading zone.

5. The face seal of claim 4 further comprising
    a plurality of outwardly extending radial passages from the annular oil passage, such that the outwardly extending radial passages provide oil to the hydrodynamic lift features of the loading zone.

6. The face seal of claim 1 wherein the face seal is positioned within a cylinder head insert in the cylinder head, and the face seal further comprises
    an outer secondary seal between the face seal and the head insert; and
    a first inner secondary seal between the face seal and the head insert.

7. The face seal of claim 6 further comprising
    a second inner secondary seal between the face seal and the head insert.

8. The face seal of claim 6 further comprising
    a pre-load means, such that the pre-load means provides a force on the face seal toward the sleeve, thereby reducing the thickness of the lubrication layer.

9. The face seal of claim 8 wherein
    the pre-load means is at least one spring positioned between the head insert and the face seal.

10. The face seal of claim 8 wherein
    the pre-load means is a plurality of springs positioned between the head insert and the face seal.

11. A poppet valved rotating sleeve internal combustion engine comprising at least one cylinder, each cylinder comprising:
    a cylinder head;
    a cylindrical rotating sleeve means comprising a first end in proximity to the cylinder head;
    a piston means which reciprocates within the rotating sleeve means;
    a combustion chamber, the chamber being the variable volume between the reciprocating piston means, the rotating sleeve means, and the cylinder head;
    a piston sealing means, such that the piston sealing means provides a seal between the piston means and the rotating sleeve means;
    a sleeve driving means, such that the sleeve driving means causes the rotating sleeve means to rotate in order to maintain hydrodynamic lubrication between the piston sealing means and the rotating sleeve means;
    an intake means, such that fuel and air may be introduced into the combustion chamber;
    an exhaust means; such that combustion gasses can be removed from the combustion chamber; and
    a hydrodynamic face seal comprising
        a face which may be positioned in proximity to the first end of the rotating sleeve; the face comprising
            an inner sealing zone, and
            an outer loading zone, such that the loading zone comprises a plurality of hydrodynamic lift features, and
        a lubricant supply means, such that the lubricant supply means provides lubricant to the mating surface, and such that a lubricant layer can be maintained between the mating surface and the rotating sleeve.

12. The face seal of claim 11 wherein the hydrodynamic lift features are recessed lift pads.

13. The face seal of claim 11 wherein the hydrodynamic lift features are tilted pads.

14. The face seal of claim 11 wherein the lubricant supply means comprises
    an oil chamber;
    an annular oil supply cavity on the face positioned between the sealing zone and the loading zone; and
    a plurality of supply passages from the oil chamber to the annular oil supply cavity, such that oil may be provided from the oil chamber through the annular oil supply cavity to the sealing zone and loading zone.

15. The face seal of claim 14 further comprising
    a plurality of outwardly extending radial passages from the annular oil passage, such that the outwardly extending radial passages provide oil to the recessed lift features of the loading zone.

16. The face seal of claim 11 wherein the face seal is positioned within a cylinder head insert in the cylinder head, and the face seal further comprises
an outer secondary seal between the face seal and the head insert; and
a first inner secondary seal between the face seal and the head insert.

17. The face seal of claim 16 further comprising
a second inner secondary seal between the face seal and the head insert.

18. The face seal of claim 16 further comprising
a pre-load means, such that the pre-load means provides a force on the face seal toward the sleeve, thereby reducing the thickness of the lubrication layer.

19. The face seal of claim 18 wherein
the pre-load means is at least one spring positioned between the head insert and the face seal.

20. The face seal of claim 18 wherein
the pre-load means is a plurality of springs positioned between the head insert and the face seal.

21. A method of sealing between the combustion chamber and the cylinder head of a rotating sleeve internal combustion engine, the engine comprising a rotating sleeve which may be rotated during the operation of the engine, the method comprising
providing a hydrodynamic face seal, the face seal comprising a face which may be positioned in proximity to a first end of the rotating sleeve; the face comprising
a sealing zone, and
a loading zone, such that the loading zone comprises a plurality of lift features;
providing a flow of lubricant to the mating surface so that a lubricant layer is maintained between the face and the rotating sleeve;
pre-loading the face seal;
maintaining a lubricant layer thickness of about 1 to 10 micrometers in the inner sealing zone;
distributing cyclic gas pressure forces from the combustion chamber during engine operation to the loading zone; and
providing lift forces with the face seal loading zone lift features to maintain the lubricant layer within the desired thickness range.

22. The method of claim 21 further comprising
maintaining a lubricant layer thickness of about 2 micrometers in the inner sealing zone.

23. A poppet valved rotating sleeve internal combustion engine comprising at least one cylinder, each cylinder comprising:
a cylinder head;
a cylindrical rotating sleeve means comprising a first end in proximity to the cylinder head, the first end comprising a plurality of hydrodynamic lift features;
a piston means which reciprocates within the rotating sleeve means;
a combustion chamber, the chamber being the variable volume between the reciprocating piston means, the rotating sleeve means, and the cylinder head;
a piston sealing means, such that the piston sealing means provides a seal between the piston means and the rotating sleeve means;
a sleeve driving means, such that the sleeve driving means causes the rotating sleeve means to rotate in order to maintain hydrodynamic lubrication between the piston sealing means and the rotating sleeve means;
an intake means, such that fuel and air may be introduced into the combustion chamber;
an exhaust means; such that combustion gasses can be removed from the combustion chamber; and
a hydrodynamic face seal comprising
a face which may be positioned in proximity to the first end of the rotating sleeve; the face comprising
an inner sealing zone, and
an outer loading zone, such that the outer loading zone is positioned substantially over the plurality of hydrodynamic lift features on the first end of the rotating sleeve; and
a lubricant supply means, such that the lubricant supply means provides lubricant to the mating surface, and such that a lubricant layer can be maintained between the mating surface and the rotating sleeve.

24. A poppet valved rotating sleeve internal combustion engine comprising at least one cylinder, each cylinder comprising:
a cylinder head;
a cylindrical rotating sleeve means comprising a first end in proximity to the cylinder head, the sleeve means including an inset portion in proximity to the first end;
a piston means which reciprocates within the rotating sleeve means;
a combustion chamber, the chamber being the variable volume between the reciprocating piston means, the rotating sleeve means, and the cylinder head;
a piston sealing means, such that the piston sealing means provides a seal between the piston means and the rotating sleeve means;
a sleeve driving means, such that the sleeve driving means causes the rotating sleeve means to rotate in order to maintain hydrodynamic lubrication between the piston sealing means and the rotating sleeve means;
an intake means, such that fuel and air may be introduced into the combustion chamber;
an exhaust means; such that combustion gasses can be removed from the combustion chamber; and
a hydrodynamic face seal comprising
a face which may be positioned in proximity to the first end of the rotating sleeve; the face comprising
an inner sealing zone, and
an outer loading zone, such that the outer loading, and
a lubricant supply means, such that the lubricant supply means provides lubricant to the mating surface, and such that a lubricant layer can be maintained between the mating surface and the rotating sleeve, and
a gas pressure activated closing force surface area, such that gas pressure on the surface area substantially offsets the axial component of gas pressure acting on the inset portion of the sleeve means.

* * * * *